United States Patent Office 3,661,875
Patented May 9, 1972

---

3,661,875
1-(1-ALKENYL)BICYCLO[1.1.0]BUTANES AND THEIR POLYMERS
James B. Sieja, Wilmington, Del., assignor to E. I. du Pont de Nemours and Company, Wilmington, Del.
No Drawing. Filed Jan. 27, 1970, Ser. No. 6,284
Int. Cl. C08f *15/02*
U.S. Cl. 260—85.5        2 Claims

ABSTRACT OF THE DISCLOSURE

Novel bicyclobutanes of the formula

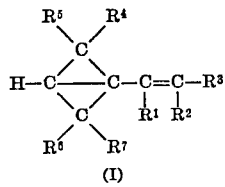

(I)

$R^1$, $R^2$, $R^3$, $R^4$, $R^5$, $R^6$, and $R^7$ may be hydrogen or a hydrocarbyl group of 1–18 carbon atoms which is free of olefinic or acetylenic unsaturation, with the proviso that the pairs $R^1$ and $R^2$, $R^2$ and $R^3$, $R^4$ and $R^5$, and $R^6$ and $R^7$ taken together may, respectively, be tetramethylene or pentamethylene diradicals. The above compounds are prepared by treating 3-alkoxycyclobutanone with a 1-alkenyl Grignard reagent to obtain the corresponding 1-alkenyl-3-alkoxy-1-hydroxycyclobutane which is treated with a hydrogen halide to form a mixture of 1-alkenyl-3-alkoxy-1-halocyclobutane and 3-alkoxy-1-(2-haloalkenylidene)cyclobutane. Those compounds are then treated with a metal capable of removing halogen (such as sodium, magnesium, zinc, etc.) to obtain the corresponding 1-(1-alkenyl)bicyclo[1.1.0]butane. These bicyclobutanes can be converted to homo- and copolymers, which are useful as self-supporting films, fibers and molding powder.

BACKGROUND OF THE INVENTION

Field of the invention

This invention is concerned with a new class of polymerizable organic compounds, and more particularly with the 1-(1-alkenyl)bicyclo[1.1.0]butanes and their polymers.

Description of the prior art

New polymerizable monomers with more than one polymerizable site in a single molecule have long been of interest for the potential rubbery properties of their polymers and the capacity of the polymers to be cured and crosslinked. The present invention concerns a new type of monomer polymerizable at two sites within the molecule and the polymers and copolymers obtained therefrom.

SUMMARY OF THE INVENTION

According to the present invention there are provided 1-(1-alkenyl)bicyclo[1.1.0]butanes of the formula

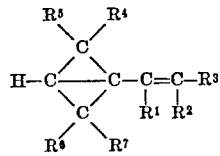

in which $R^1$, $R^2$, $R^3$, $R^4$, $R^5$, $R^6$, and $R^7$ may be hydrogen or a hydrocarbyl group of 1–18 carbon atoms which is free of olefinic or acetylenic unsaturation, with the proviso that the pairs $R^1$ and $R^2$, $R^2$ and $R^3$, $R^4$ and $R^5$, and $R^6$ and $R^7$ taken together may, respectively, be tetramethylene or pentamethylene diradicals [—(CH$_2$)$_4$— or —(CH$_2$)$_5$—].

According to the present invention there is also provided a process for preparing 1-(1-alkenyl)-bicyclo[1.1.0]butanes comprising (1) contacting 3-alkoxycyclobutanone with a 1-alkenyl Grignard reagent at about 0° C.–100° C. under anhydrous conditions and adding aqueous mineral acid to the resulting reaction mixture to obtain the corresponding 1-alkenyl-3-alkoxy-1-hydroxycyclobutane;

(2) contacting said 1-alkenyl-3-alkoxy-1-hydroxycyclobutane with a hydrogen halide at about 0° C.–50° C. to form a mixture of 1-alkenyl-3-alkoxy-1-halocyclobutane and 3-alkoxy-1-(2-haloalkenylidene)cyclobutane;

(3) contacting said 1-alkenyl-3-alkoxy-1-halocyclobutane and/or 3-alkoxy-1-(2-haloalkenylidene)cyclobutane at about 0° C.–100° C. with a metal capable of removing halogen to obtain the coresponding 1-(1-alkenyl)-bicyclo[1.1.0]butane.

Further, according to the present invention the bicyclobutane monomers can be converted to homo- and copolymers with the aid of free radical, cationic, anionic and coordination-type polymerization catalysts.

The use of the phrase "consisting essentially of" does not exclude unspecified conditions or materials which do not prevent the advantages of the present invention from being realized.

DESCRIPTION OF THE PREFERRED EMBODIMENTS

The 1-(1-alkenyl)bicyclo[1.1.0]butane monomers of this invention may be represented by the formula

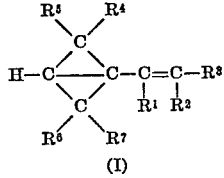

(I)

in which $R^1$, $R^2$, $R^3$, $R^4$, $R^5$, $R^6$, and $R^7$ are alike or different and may be hydrogen or a hydrocarbyl group of 1–18 carbon atoms which is free of olefinic or acetylenic unsaturation, with the proviso that the pairs $R^1$ and $R^2$, $R^2$ and $R^3$, $R^4$ and $R^5$, and $R^6$ and $R^7$ taken together may, respectively, be tetramethylene or pentamethylene diradicals [—(CH$_2$)$_4$— or —(CH$_2$)$_5$—].

In defining the terms $R^1$ to $R^7$ above, the term "hydrocarbyl free of ethylenic and acetylenic carbon-to-carbon unsaturation" includes those hydrocarbyl groups which do not contain aliphatic double or triple bonds. Thus, the hydrocarbyl groups as defined herein include alkyl, cycloalkyl, aralkyl, alkaryl, and aryl. Illustrative hydrocarbyl groups as defined hereinabove include alkyl groups, such as methyl, ethyl, t-butyl, hexyl, isooctyl, dodecyl, octadecyl, and the like; cycloalkyl groups such as cyclopropyl, cyclobutyl, cyclopentyl, cyclohexyl, cyclooctyl, methylcyclohexyl, 3,5-dicyclohexylcyclohexyl, cyclooctadecyl, and the like; aryl groups such as phenyl, naphthyl, anthryl, p-phenylphenyl, p-biphenylphenyl, naphthacenyl, benzanthryl, chrysenyl, and the like; alkaryl groups such as p-tolyl, p-cumenyl, 2,4,6-tributylphenyl, 9,10-diethyl-1-anthryl, 6-methyl-2-naphthyl, and the like; and aralkyl groups such as benzyl, phenylethyl, diphenylmethyl, α-naphthylethyl, 2-(2-anthryl)ethyl, 4-(2-anthryl)butyl, and the like. Preferred herein are hydrocarbyl groups containing 1–12 carbon atoms, and particulrly those containing 1–6 carbon atoms.

Compounds of Formula I are prepared by the following steps: A 3-alkoxycyclobutanone (II) is treated with a 1-alkenyl Grignard reagent (III) to obtain the corresponding 1 - alkenyl - 3 - alkoxy - 1 - hydroxycyclobutane (IV). This compound is treated with a hydrogen halide to form a mixture of a 1-alkenyl-3-alkoxy-1-halocyclobutane (V) and a 3-alkoxy-1-(2-haloalkenylidene)cyclobutane (VI). Compound V and/or Compound VI is then treated with a metal capable of removing halogen (such as sodium, magnesium, zinc, or the like) to obtain the corresponding 1-(1-alkenyl)bicyclo[1.1.0]butane of Formula I.

This process may be summarized as follows:

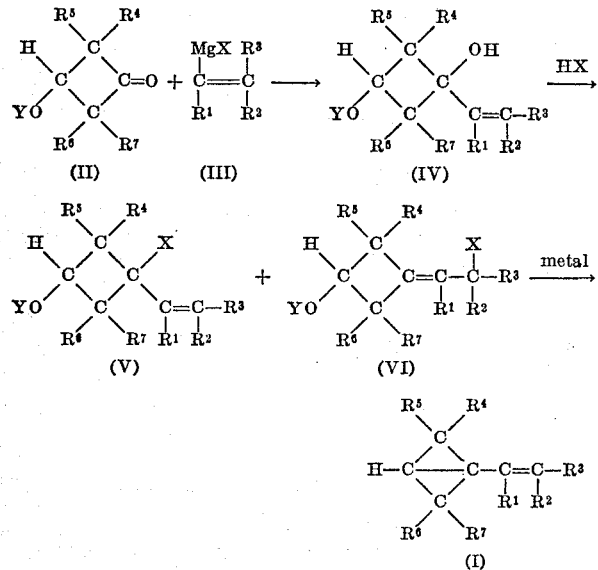

in which the R's are defined as above, X is chlorine, bromine, or iodine and Y is a lower alkyl group, particularly a saturated alkyl group having six or fewer carbon atoms.

The 3-alkoxycyclobutanones of Formula II are prepared by the reaction of the appropriate ketene (XV) with the appropriate 1-alkenyl ether (XVI) as follows:

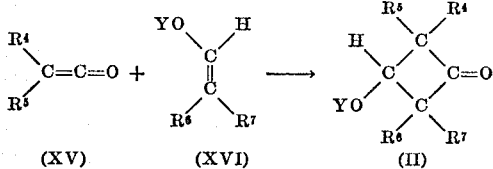

This reaction is carried out according to the procedure of R. H. Hasek et al., J. Org. Chem. 29, 1239–41 (1964).

Compounds of Formula II in which any or all of $R^4$, $R^5$, $R^6$, and/or $R^7$ are hydrogen may be further substituted by treatment with a hydrocarbyl iodide and sodium hydride to insert the hydrocarbyl group as $R^4$, $R^5$, $R^6$, and/or $R^7$.

The reaction of a 3-alkoxycyclobutanone of Formula II with a 1-alkenyl Grignard reagent of Formula III to form a 3-alkoxy-1-alkenyl-1-hydroxycyclobutane of Formula IV as shown above is preferably carried out as follows: The Grignard reagent is freshly prepared by treating the corresponding halide of formula $CR^2R^3$=$CR^1X$ with at least one molecular equivalent of magnesium metal under anhydrous conditions and in the presence of an inert organic solvent such as diethyl ether, dibutyl ether, tetrahydrofuran, and the like. A small amount of a Grignard activating agent may be added if needed to start the reaction. To the resulting Grignard solution is added gradually the 3-alkoxycyclobutanone of Formula II, the temperature being maintained in the range of 0° to 100° C., and preferably from 0° to 50° C. The resulting reaction mixture is treated with aqueous mineral acid. The organic phase is separated and dried and the 1-alkenyl-3-alkoxy-1-hydroxycyclobutane of Formula IV is recovered by known means, such as distillation.

The 1 - alkenyl - 3 - alkoxy - 1 - hydroxycyclobutane of Formula IV is then dissolved in an inert hydrocarbon (pentane, cyclohexane, etc.) and agitated with a chemical excess of concentrated aqueous hydrochloric, hydrobromic or hydroiodic acid for a period from 1 minute to 1 hour or more. This reaction is carried out in the temperature range between 0° C. and 50° C. and preferably at room temperature. The organic phase is then washed with water, separated and dried. The resulting 1-alkenyl-3-alkoxy-1-halocyclobutane of Formula V and 3-alkoxy-1-(2-haloalkanylidene)cyclobutane of Formula VI are recovered either separately or as a mixture by known means such as distillation.

The 1-alkenyl-3-alkoxy-1-halocyclobutane of Formula V and/or the 3-alkoxy-1-(2-haloalkanylidene)cyclobutane of Formula VI are treated with at least a slight chemical excess of a metal of the type capable of removing halogen. Suitable metals are those of Groups I–A, I–B, II–A, and II–B of the Deming Periodic Table, e.g., Li, Na, K, Rb, Cs, Mg, Ca, Sr, Ba, Cu, Ag, Zn, Cd, Hg, and the like. The reaction may be carried out neat or in the presence of an organic solvent which is inert to the reactants and products. Suitable solvents are hydrocarbons such as pentane and hexane, and ethers such as diethyl ether and tetrahydrofuran. The reaction is preferably carried out in the temperature range from 0° to 100° C. and may require from a few minutes to several days to yield substantial quantities of the 1-(1-alkenyl)bicyclo[1.1.0]butane monomer of Formula I. This latter product is recovered by known means, such as distillation. During the recovery step it may be desirable to employ small quantities of a known inhibitor of vinyl polymerization to prevent premature polymerization of the alkenylbicyclobutane product.

Optionally, the above process for preparing 1-(1-alkeyl)bicyclo[1.1.0]butane may be carried out without separately isolating each intermediate.

Compounds of Formula I are readily converted to their homopolymers and to copolymers with addition polymerizable ethylenically unsaturated monomers and/or strained ring compounds by the action of free radical, anionic, cationic or coordination-type polymerization catalysts.

Included within the definition of copolymers are terpolymers and higher multicomponent copolymers containing 1, 2, 3, 4, 5 or more comonomers in addition to a 1-(1-alkenyl)bicyclo[1.1.0]butane monomer.

The homopolymers and copolymers of this invention as first formed may contain any or all of the chain units:

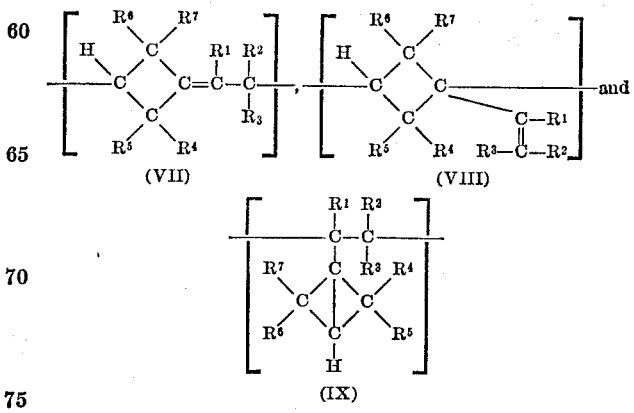

Such units contain catenarian or side-chain double bonds or side-chain bicyclo[1.1.0]butane rings which are sites for further polymerization (i.e., chain branching) or for crosslinking by reaction with crosslinking agents.

Homopolymers may be represented by a structure having $n$ units of Formulas VII, VIII and/or IX, where $n$ is greater than 4. Statistical copolymers, including alternating copolymers, consist essentially of repeating units selected from the units represented by Formula X:

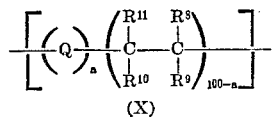

(X)

or by Formula XI:

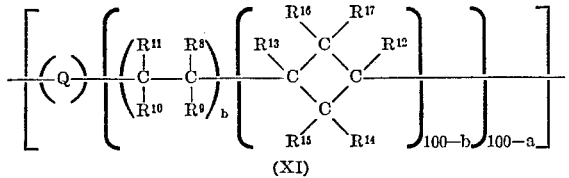

(XI)

or by Formula XII:

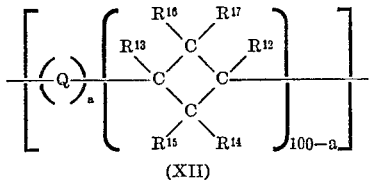

(XII)

in which Q is any one or a combination of units of Formulas VII, VIII or IX; $R^8$ may be hydrogen, halogen, lower alkyl, phenyl, lower alkoxy, lower alkylcarbonyl (i.e., acyl), carboxy, lower alkoxycarbonyl, lower alkylcarbonyloxy (i.e., acyloxy), cyano, carbamoyl or N,N-di(lower alkyl)carbamoyl; $R^9$ may be hydrogen, halogen (i.e., fluorine, chlorine, bromine, or iodine), lower alkyl (i.e., a saturated alkyl group of six or fewer carbon atoms), vinyl, halovinyl, loweralkylvinyl, cyano, methylpyridinyl or phenylene sodium sulfonate; $R^{10}$ may be hydrogen, halogen, carboxy or lower alkoxycarbonyl; $R^{11}$ may be hydrogen or halogen with the proviso that $R^9$ and $R^{10}$ taken together may be an alkylene group of 1–6 carbon atoms; $R^{12}$ and $R^{13}$ each may be hydrogen, halogen, hydroxyloweralkyl, hydroxyphenyl, lower-alkoxyloweralkyl, lower-alkoxyphenyl, haloloweralkyl, halophenyl, —COOH, —COOR, —COSR, —COOM, —CONH$_2$
—CONHR, —CONR$_2$, —SO$_2$R, —CHO, —COR
—OCOR, —OR, —NO$_2$, —CN, or —R wherein M is one equivalent of a metal cation and R is hydrocarbyl of up to 18 carbon atoms free of ethylenic and acetylenic carbon-to-carbon unsaturation, especially alkyl or lower alkyl; $R^{14}$, $R^{15}$, $R^{16}$ and $R^{17}$ may be hydroxy, amino, —NR$_2$, or $R^{12}$, R being as above; $a$ is the mole percent of recurring Q units in the copolymer, being any number, including decimal fractions, between 1 and 99 and $b$ is any mole percentage from 0 to 100 inclusive. It will be understood that these formulas do not indicate in any manner how or in what sequence the different recurring units appear in the linear polymer chain. The formulas are, in fact, expressly intended to cover all the different random attachments, i.e., head-to-head, tail-to-head, etc., of one or more of the different Q moieties with one or more of the different ethane moieties and/or cyclobutane moieties found in all possible statistical isomers. It is to be understood that when $R^9$ is vinyl or substituted vinyl, the resulting diene may be copolymerized in 1,2 or 1,4 configurations or in a combination of these. A detailed discussion of the term "statistical copolymer" can be found in U.S. 3,264,275.

In the above definitions, "halogen" includes fluorine, chlorine, bromine and iodine, and "lower" means up to 6 carbons in the hydrocarbon part of the radical.

The copolymers of Formulas X, XI and XII have molecular weights no less than about 500. In any given copolymer molecule there are no less than two of any of the monomer component units appearing therein.

Addition polymerizable, ethylenically unsaturated monomers suitable for preparing the copolymers of this invention may be represented by the formula

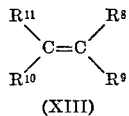

(XIII)

in which $R^8$, $R^9$, $R^{10}$, and $R^{11}$ are defined as above.

Thus, the unsaturated polymerizable comonomers can be compounds such as olefins, e.g., ethylene, propylene, isobutylene, and the like; vinyl monomers, e.g., acrylonitrile, vinyl chloride, vinyl fluoride, styrene, methacrylic acid, methyl methacrylate, acrylic acid, ethyl acrylate, butyl acrylate, acrylamide, methacrylamide, N,N-dimethylacrylamide, vinyl acetate, methyl vinyl ether, methyl vinyl ketone, sodium styrene sulfonate, 2-methyl-5-vinylpyridine, and the like; vinylidene monomers, e.g., α-methylstyrene, vinylidene chloride, vinylidene fluoride, vinylidene cyanide, and the like; 1,2-disubstituted ethylenes, e.g., fumaric and maleic esters, maleic anhydride, and the like; polymerizable perhalogenated ethylenes, e.g., chlorotrifluoroethylene, tetrafluoroethylene, and the like; conjugated diolefins, e.g., butadiene, isoprene, 2-chlorobutadiene, 2-cyanobutadiene; cyclic olefins, e.g., cyclopropene, cyclobutene, cyclopentene, cyclohexene, norbornene, and the like; and substituted cyclic olefins, e.g., 1-methylcyclopropene.

A preferred group of ethylenically unsaturated monomers that are especially useful in forming the copolymers of this invention include those having the general formula $CH_2=CR^8R^9$. These yield copolymers of Formula X in which $R^{10}$ and $R^{11}$ are hydrogen.

The strained ring compounds to be copolymerized in this invention may be represented by Formula XIV

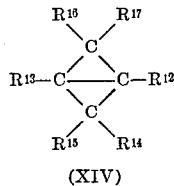

(XIV)

wherein $R^{12}$, $R^{13}$, $R^{14}$, $R^{15}$, $R^{16}$ and $R^{17}$ are also as defined previously. Thus the strained ring polymerizable comonomers can be bicyclic and polycyclic compounds, such as 1-cyanobicyclo[1.1.0]butane, 3-chloro - 1 - cyanobicyclo [1.1.0]butane, 1-acetylbicyclo[1.1.0]butane and the like.

For preparing the homopolymers and copolymers of this invention, the free-radical-generating initiators may be selected from a wide variety of compounds representative of this type of initiator. Included are the azo initiators, e.g., α,α'-azodiisobutyronitrile, 1,1'-azodicyclohexanecarbonitrile, dimethyl α,α'-azodiisobutyrate and α,α'-azodiisobutyramide, and the organic peroxides and hydroperoxides, e.g., dibenzoyl peroxide, di-t-butyl peroxide, and t-butyl hydroperoxide. The initiators can be used in proportions ranging from 0.01 to 10 weight percent of the monomer or comonomers being polymerized. Other sources of free radicals for initiating polymerization may also be used such as electron bombardment, ultraviolet light in the presence of a sensitizer, and the like.

Suitable solvents and/or dispersion media for free-radical polymerization and copolymerization include water, hydrocarbons such as benzene and hexane, chlorinated aromatic hydrocarbons such as chlorobenzene, nitriles such as acetonitrile, amides such as dimethylformamide and N-methylpyrrolidone, sulfoxides such as tetramethylenesulfoxide, and the like. It is not essential that a solvent or dispersion medium be used, and bulk polymerizations can be carried out.

A wide variety of anionic initiators are operable herein for polymerization and copolymerization. Representative anionic initiators that can be used include the alkali metal alkyls, e.g., n-butyllithium and methyllithium; the alkali metal alkoxides, e.g., potassium t-butoxide and sodium methoxide; and the alkali metal aryls, e.g., sodium naphthalene. The concentration of anionic initiator empolyed can range from 0.01 to 10 weight percent of the monomer or monomers being polymerized. The order of addition of the monomer and the initiator is not critical.

Suitable reaction media for anionic polymerization include ethers, e.g., diethyl ether, tetrahydrofuran, and the dimethyl ether of ethylene glycol; hydrocarbons, e.g., benzene and hexane; chlorinated hydrocarbons, e.g., chlorobenzene; and amides, e.g., dimethylformamide. The ethers are preferred. However, the polymerization can also be carried out in the absence of solvents.

Representative cationic initiators which may be used include boron trifluoride and trichloride, aluminum trichloride, silicon tetrafluoride, phosphorus and arsenic tri- and pentafluorides and chlorides, aluminum tribromide, titanium tetrachloride, ferric chloride, and the like. The concentration of initiator may be from 0.01 to 10 weight percent of the monomer or monomers being polymerized.

Coordination-type initiators usually involve a combination of a lower valent transition metal chloride with an organometallic compound. Specific combinations which are useful include diisobutylaluminum chloride with vanadium tri(acetylacetonate), diisobutylaluminum chloride with vanadium oxychloride, triisobutylaluminum with titanium tetrachloride, methylmagnesium bromide with titanium tetrachloride, lithium aluminumtetradecyl with titanium tetrachloride, and the like. The concentration of initiator may be from 0.01–10 weight percent of the monomer or monomers being polymerized.

Whereas they are not essential, preferred reaction media for carrying out polymerizations initiated by cationic-type or coordination-type catalysts are the hydrocarbons, particularly aliphatic hydrocarbons such as hexane and cyclohexane and the halogenated hydrocarbons such as tetrachloroethylene.

Selection of the particular polymerization catalyst is influenced, at least in part, by the nature of the monomers to be polymerized. The proper matching of the disclosed monomers and catalysts is well within the knowledge of one skilled in the art. Thus, it is known, e.g., that propylene responds poorly to free radical catalysis, acrylonitrile would poison a coordination catalyst, etc.

Selection of the reaction temperature depends largely upon the particular initiator being used. Some cationic initiator work well at −80° C. Some peroxides work well above 190° C. Generally, a temperature range of about −100° C.–200° C. is suitable, however, the full range would not apply to any one of the types of initiators recited. Reaction temperatures between about −20° C. and 60° C. are preferred.

Reaction times can vary from a few seconds (i.e., 5) to several days, e.g., 2 to 3 days or more depending on the particular comonomers, initiator, solvent, and reaction temperature employed.

Pressures above and below atmospheric pressure are operable. Atmospheric and superatmospheric pressures are preferred.

In the examples which follow, parts and percentages are by weight unless otherwise specified.

EXAMPLE 1

Part A.—1-hydroxy-1-vinyl-3-ethoxycyclobutane

To 14.5 parts of magnesium turnings was added 350 parts of dry tetrahydrofuran and 1 part of 1,2-dibromoethane. The solution was heated to 50° C. to activate the magnesium and then cooled to 25° C. While maintaining the temperature at 25–35° C., 80 parts of vinyl bromide was bubbled into the solution over 2 hours. After all the magnesium had dissolved, the solution was cooled. To the solution was added at 0° C. to 10° C. over 1 hour 57 parts of 3-ethoxycyclobutanone in 42 parts of dry tetrahydrofuran. The mixture was stirred at 25° C. for 1 hour, cooled, and acidified with 50% hydrochloric acid solution. The layers were separated, and 200 parts of water were added to the lower water layer. The water was then extracted five times with 70-part portions of ether, which was then combined with the original tetrahydrofuran layer. The organic phase was washed with 100 parts of saturated sodium bicarbonate solution, 100 parts of saturated sodium chloride solution, and then dried over magnesium sulfate. The solvent was removed, and the residue was distilled to give 50 parts of 1-hydroxy-1-vinyl-3-ethoxycyclobutane, B.P. 46° C./0.35 mm. The infrared and NMR spectra were consistent with the proposed structure.

*Analysis.*—Calcd. for $C_8H_{14}O_2$ (percent): C, 67.57; H, 9.92. Found (percent): C, 66.57, 66.23; H, 10.10, 10.08.

Part B.—1-chloro-1-vinyl-3-ethoxycyclobutane and 1-(2-chloroethylidene)-3-ethoxycyclobutane In a separatory funnel was placed 60 parts of pentane, 24.6 parts of 1-hydroxy-1-vinyl-3-ethoxycyclobutane, and 75 parts of concentrated aqueous hydrochloric acid. The mixture was shaken for 5 minutes, and the layers were separated. The aqueous phase was washed with 15 parts of pentane and then poured into 300 parts of ice water. This was extracted 3 times with 30-part portions of pentane. The combined organic phase was washed four times with 150-part portions of ice water, 100 parts of saturated sodium chloride solution, and then dried. Removal of solvent and fractional distillation gave 3.7 parts of 1-chloro-1-vinyl-3-ethoxycyclobutane, B.P. 43° C./2.7 mm., $n_D^{25} = 1.4532$.

*Analysis.*—Calcd. for $C_8H_{13}OCl$ (percent): C, 59.82; H, 8.16; Cl, 22.08. Found (percent): C, 59.78; H, 8.36; Cl, 22.29.

The second cut contained 9.3 parts of 1-(2-chloroethylidene)-3-ethoxycyclobutane, B.P. 66° C./2.7 mm., $n_D^{25} = 1.4743$.

*Analysis.*—Found (percent): C, 59.52; H, 8.30; Cl, 21.19 (21.92 rerun). The infrared and NMR spectra were consistent with the proposed structures.

Part C.—1-vinylbicyclobutane

To 30 parts of magnesium turnings in 1000 parts of refluxing ether was added over 23 hours 161 parts of 1-(2-chloroethylidene)-3-ethoxycyclobutane. All volatile material was then removed under reduced pressure. Small amounts of phenothiazine and phenyl-β-naphthylamine were added to the volatiles which were then distilled. About 20 parts of 1-vinylbicyclobutane was obtained, B.P. 41° C./275 mm. The infrared, NMR, and UV spectra were consistent with the proposed structure.

*Analysis.*—Calcd. for $C_6H_8$ (percent): C, 89.94; H, 10.06. Found (percent): C, 88.82, 88.75; H, 9.32, 10.02.

EXAMPLE 2

Homopolymer of 1-vinylbicyclobutane

A sample of 1-vinylbicyclobutane containing a small amount of α,α′-azodiisobutyronitrile was heated in a sealed glass tube at 60° C. for 2 days. The solid rubbery plug was removed from the tube, dissolved in hexane, and precipitated from methanol to give crumbs of rubbery polymer. On standing, the polymer cured and became harder, presumably through crosslinking by reaction with oxygen of the air. When a freshly prepared hexane solution of the type noted above is cast on a flat surface under a doctor knife and the hexane is evaporated, there is obtained a clear rubbery film. Upon contact with air this film cures rapidly by crosslinknig to a stiff self-supporting film useful for wrapping and packaging.

EXAMPLE 3

In a glass reactor and under a nitrogen atmosphere, a mixture of 1.6 ml. of 1-vinylbicyclobutane, 0.10 g. of $\alpha,\alpha'$-azodiisobutyronitrile, 10 ml. of 10% aqueous soap solution and 0.2 ml. of isobutyraldehyde was agitated at 70° C. for 16 hours. While still under nitrogen, the reaction mixture was agitated with 50 ml. of saturated aqueous KCl and the coagulated solid polymer was filtered off. It was washed thoroughly with water and dried to give 1.24 g. of rubbery solid. This was dissolved in chloroform to yield a polymer solution suitable for film casting. The polymer was recovered from chloroform solution by drowning in methanol. It was filtered, still under nitrogen, and dried to give 0.50 g. of rubbery polymer. After this was exposed to air for a few hours it was no longer soluble in chloroform, showing it had become crosslinked.

EXAMPLE 4

Copolymer of 1-vinylbicyclobutane and acrylonitrile

To 5.4 parts of freshly boiled water were added 0.080 part of solid lauryl sulfate and 0.008 part of potassium persulfate. To this was added 0.667 part of acrylonitrile, 0.019 part of decanethiol, and 2.0 parts of 1-vinylbicyclobutane. The mixture was sealed in a bottle and rotated for 21 hours in a water bath maintained at 37° C. Then a solution of 0.003 part of hydroquinone in 0.3 part of water was added. Tumbling of the mixture was continued for 15 minutes. The mixture was then poured into 100 parts of isopropanol containing 0.2 part of phenyl-$\beta$-naphthylamine. The solid which had precipitated was washed twice with fresh isopropanolphenyl-$\beta$-napthylamine solution and filtered. The solid copolymer was then washed with fresh isopropanol to give a rubbery, light tan polymer. It was dried at 80° C. in a vacuum oven to give 0.570 part of polymer which was rubbery when warm but hardened on cooling, presumably due to crosslinking.

*Analysis.*—Found (percent): C, 81.09; H, 8.63; N, 8.18. The analysis corresponds to a copolymer containing acrylonitrile and 1-vinylbicyclobutane in a mole ratio of 1:1.5. The fresh, warm copolymer is thermoplastic and can be pressed between hot platens to yield film which after exposure to air rapidly crosslinks to form a self-supporting film suitable for wrapping and packaging.

When the bicyclobutanes of Formula XIV listed below are substituted for part, or all, of the acrylonitrile in the procedures of Example 4, the corresponding 1-vinyl-bicyclobutane - acrylonitrile - bicyclobutane and 1-vinylbicyclobutane - bicyclobutane copolymers are obtained.

BICYCLOBUTANES bicyclo[1.1.0]butane
1-hydroxymethylbicyclo[1.1.0]butane
1,3-bis(trifluoromethyl)-2,2,4,4-tetrafluorobicyclo-
 [1.1.0]butane
2,4-bis(methoxycarbonyl)bicyclo[1.1.0]butane
2,4-bis(ethoxycarbonyl)-1-methyl-3-phenylbicyclo-
 [1.1.0]butane
1,3-dimethylbicyclo[1.1.0]butane
1-methoxycarbonylbicyclo[1.1.0]butane
1-ethoxycarbonylbicyclo[1.1.0]butane
1-carboxybicyclo[1.1.0]butane
2-carboxy-1,3-diphenylbicyclo[1.1.0]butane
1-propionyloxy-2,2,4,4-tetramethylbicyclo[1.1.0]butane
1-carbamoyl-3-methylbicyclo[1.1.0]butane
2-n-butyl-1-cyano-3(9-heptadecyl)-2-methylbicyclo-
 [1.1.0]butane
1-cyano-4-cyclohexyl-2-cyclopropyl-2,3-dimethyl-
 bicyclo[1.1.0]butane
2-benzyl-1-cyano-2-methyl-3-tetradecylbicyclo-
 [1.1.0]butane
1-cyano-3-methyl-2-($\beta$-naphthyl)bicyclo[1.1.0]butane
1-cyano-2-($\alpha$-naphthyl)-2-phenyl-3-(1-phenyl-1-p-tolyl)
 methylbicyclo[1.1.0]butane
1-cyano-3-($\beta$-cyclohexylethyl)bicyclo[1.1.0]butane
1-cyano-2-cyclohexylmethyl-3-methylbicyclo[1.1.0]
 butane
1-phenylbicyclo[1.1.0]butane
1-p-hydroxyphenylbicyclo[1.1.0]butane
1-p-chlorophenylbicyclo[1.1.0]butane
1-ethylthiocarbonylbicyclo[1.1.0]butane
1-chlorobicyclo[1.1.0]butane
3-chloro-1-methoxycarbonylbicyclo[1.1.0]butane
1-methoxybicyclo[1.1.0]butane
1-acetoxybicyclo[1.1.0]butane
1-nitrobicyclo[1.1.0]butane
1-p-tolylsulfonylbicyclo[1.1.0]butane
1-N-ethylcarbamoylbicyclo[1.1.0]butane
1-N,N-dimethylcarbamoylbicyclo[1.1.0]butane
1-formylbicyclo[1.1.0]butane
1-($\beta$-hydroxyethyl)bicyclo[1.1.0]butane
1-($\beta$-chloroethyl)bicyclo[1.1.0]butane
2,4-dicyanobicyclo[1.1.0]butane
1,2,3,4-tetracyanobicyclo[1.1.0]butane
2,4-dichlorobicyclo[1.1.0]butane
2,4-bis(methylsulfonyl)bicyclo[1.1.0]butane
2,4-dinitrobicyclo[1.1.0]butane
2,4-diacetylbicyclo[1.1.0]butane
2,4-bis(diethylamino)bicyclo[1.1.0]butane
2,4-bis(n-butoxy)bicyclo[1.1.0]butane
2,4-bis(hydroxy)bicyclo[1.1.0]butane
2,4-dibromobicyclo[1.1.0]butane
2,4-diiodobicyclo[1.1.0]butane
1-acetylbicyclo[1.1.0]butane
sodium bicyclo[1.1.0]butane-1-carboxylate The homopolymers and copolymers of this invention as shown above are useful in self-supporting film for packaging, in fiber form for clothing fabrics, particularly elastic fabrics, and in molded form for durable cups, boxes and containers of all sorts.

Other 1-(1-alkenyl)bicyclo[1.1.0]butanes are prepared as summarized in the table below. Known ketenes, shown in column A, and alkenyl ethers, shown in column B, are substituted in the procedure of Hasek et al. noted above to obtain the 3-alkoxycyclobutanones of Formula II shown in column C. These latter compounds are then treated by the procedure of Example 1, Part A, with Grignard reagents prepared from the halides shown in column D to obtain the 1-alkenyl-3-alkoxy-1-hydroxy-cyclobutanes of Formula IV shown in column E. These in turn are substituted for 3-ethoxy-1-hydroxy-1-vinylcyclobutane in the procedures of Example 1, Parts B and C to obtain the 1-(1-alkenyl)bicyclo[1.1.0]butanes of Formula I shown in column F. These 1-(1-alkenyl)bicyclo[1.1.0]butanes are converted to their homopolymers and to their copolymers with any or all of the compounds of Formulas XIII and XIV named above by employing the procedures of Examples 2 and 3 as well as the other initiating systems described above.

Ethyl $\beta$-octadecylvinyl ether for use in item 14 of the table is prepared by treating eicosanal with ethanol in the presence of an acidic catalyst to obtain the corresponding diethyl acetal. The acetal is treated with a strong acid to split out ethanol and yield ethyl $\beta$-octadecylvinyl ether.

TABLE

| Item | A. Ketene | B. 1-alkenyl ether | C. 3-alkoxycyclobutanone | D. Halide | E. 1-alkenyl-3-alkoxy-1-hydroxycyclobutane | F. 1-(1-alkenyl)bicyclo[1.1.0]butane |
|---|---|---|---|---|---|---|
| 1 | | | | | | |
| 2 | | | | | | |
| 3 | | | | | | |
| 4 | | | | | | |
| 5 | | | | | | |
| 6 | | | | | | |

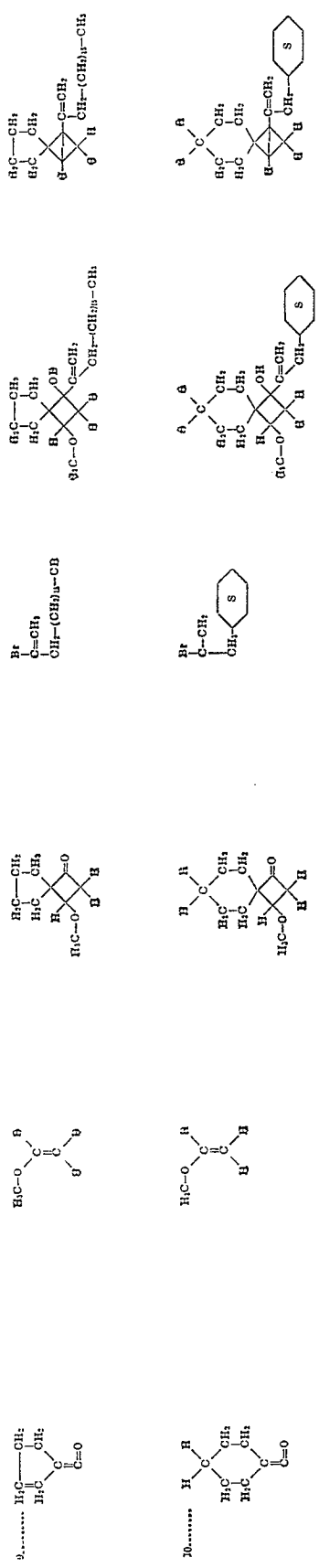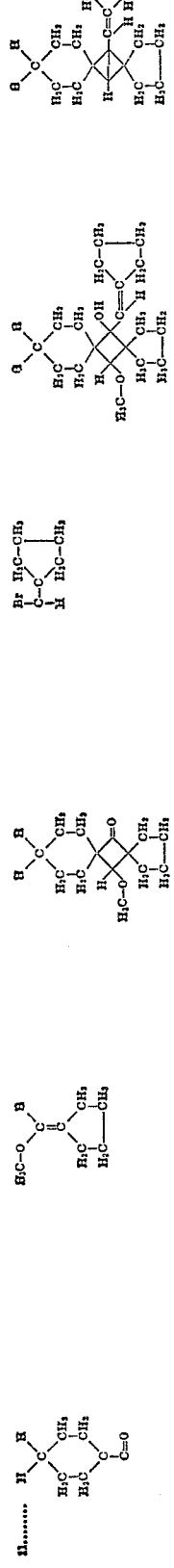

3,661,875

15 16

TABLE—Continued

| Item | A. Ketene | B. 1-alkenyl ether | C. 3-alkoxycyclobutanone | D. Halide | E. 1-alkenyl-3-alkoxy-1-hydroxycyclobutane | F. 1-(1-alkenyl)bicyclo[1.1.0]butane |
|---|---|---|---|---|---|---|
| 12 | | | | | | |
| 13 | | | | | | |
| 14 | | | | | | |
| 15 | | | | | | |
| 16 | | | | | | |
| 17 | | | | | | |

The embodiments of the invention in which an exclusive property or privilege is claimed are defined as follows:

1. A copolymer consisting essentially of from 1 to 99 mole percent of units derived from polymerization of
   (a) 1-(1-alkenyl)bicyclo[1.1.0]butane of the formula

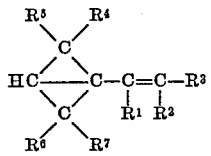

in which $R^1$, $R^2$, $R^3$, $R^4$, $R^5$, $R^6$, and $R^7$ are selected from the group consisting of hydrogen or a hydrocarbyl group of 1–18 carbon atoms which is free of olefinic or acetylenic unsaturation, with the proviso that the pairs $R^1$ and $R^2$, $R^2$ and $R^3$, $R^4$ and $R^5$, and $R^6$ and $R^7$ taken together may, respectively, be tetramethylene or pentamethylene diradicals $$[(CH_2)_4\text{— or —}(CH_2)_5\text{—}]$$

and (b) from 99 to 1 mole percent of units derived from polymerization of at least one member selected from the group consisting of ethylenically unsaturated monomers selected from the group consisting of acrylonitrile, vinylidene cyanide, and cyanobutadiene.

2. A copolymer according to claim 1 wherein the comonomers are 1-vinylbicyclobutane and acrylonitrile.

References Cited

UNITED STATES PATENTS

| | | | |
|---|---|---|---|
| 3,383,371 | 5/1968 | Natta et al. | 260—79.5 |
| 3,523,928 | 8/1970 | Blanchard | 260—80 |

JOSEPH L. SCHOFER, Primary Examiner

R. A. GAITHER, Assistant Examiner

U.S. Cl. X.R.

117—161; 260—78.5, 82.1, 85.7, 86.1, 87.5, 87.7, 88.2 R, 93.1, 666